(12) United States Patent  
Zielinski

(10) Patent No.: US 8,464,740 B2  
(45) Date of Patent: Jun. 18, 2013

(54) COMBUSTOR FUEL CONTROL SYSTEMS WITH FLOW DIVIDER ASSEMBLIES

(75) Inventor: Edward Zielinski, South Bend, IN (US)

(73) Assignee: Honeywell International Inc., Morristown, NJ (US)

(*) Notice: Subject to any disclaimer, the term of this patent is extended or adjusted under 35 U.S.C. 154(b) by 25 days.

(21) Appl. No.: 13/159,175

(22) Filed: Jun. 13, 2011

(65) Prior Publication Data

US 2012/0312378 A1 Dec. 13, 2012

(51) Int. Cl.
  *G05D 11/03* (2006.01)
  *F02C 9/26* (2006.01)
(52) U.S. Cl.
  USPC .......... 137/9; 137/100; 137/101; 60/772; 60/39.281; 60/733; 60/739
(58) Field of Classification Search
  USPC ............ 137/98, 99, 100, 101, 118.06, 9, 137/12; 60/39.281, 39.826, 733, 734, 739, 60/741, 746, 747, 772
  See application file for complete search history.

(56) References Cited

U.S. PATENT DOCUMENTS

| | | | |
|---|---|---|---|
| 2,953,150 A * | 9/1960 | Davis | 137/99 |
| 3,033,277 A * | 5/1962 | Cowles et al. | 60/39.094 |
| 4,231,441 A | 11/1980 | Burckhardt | |
| 4,465,089 A * | 8/1984 | Inhofer | 137/101 |
| 4,691,730 A | 9/1987 | Portolese et al. | |
| 4,949,538 A * | 8/1990 | Iasillo et al. | 60/39.465 |
| 5,321,949 A | 6/1994 | Napoli et al. | |
| 5,339,636 A | 8/1994 | Donnelly et al. | |
| 5,442,922 A | 8/1995 | Dyer et al. | |
| 5,448,882 A | 9/1995 | Dyer et al. | |
| 6,092,546 A | 7/2000 | Lebrun et al. | |
| 6,637,184 B2 | 10/2003 | Freeman | |
| 6,751,939 B2 | 6/2004 | Futa, Jr. et al. | |
| 6,892,544 B2 | 5/2005 | Futa, Jr. et al. | |
| 7,036,302 B2 | 5/2006 | Myers Jr. et al. | |
| 7,137,242 B2 | 11/2006 | Griffiths | |
| 2010/0037612 A1 | 2/2010 | Futa et al. | |
| 2010/0050593 A1 | 3/2010 | Futa et al. | |
| 2010/0058770 A1 | 3/2010 | Ryan | |

* cited by examiner

*Primary Examiner* — John Fox
*Assistant Examiner* — Kevin Murphy
(74) *Attorney, Agent, or Firm* — Ingrassia Fisher & Lorenz, P.C.

(57) ABSTRACT

A flow divider assembly includes a dividing valve and a balancing valve. The dividing valve includes a dividing cavity configured to receive a flow of fuel and a piston device arranged within the dividing cavity and selectively positioned to divide the flow of fuel in the dividing cavity into the first dividing valve port and the second dividing valve port. The balancing valve is fluidly coupled to the dividing valve and configured to receive the first portion and the second portion of the flow. The balancing valve includes a balancing cavity and a balancing device arranged within the balancing cavity and selectively positioned to direct the first portion of the flow into the first balancing cavity port at a third pressure and the second portion of the flow into the second balancing cavity port at a fourth pressure such that the first pressure is approximately equal to the second pressure.

19 Claims, 5 Drawing Sheets

US 8,464,740 B2

COMBUSTOR FUEL CONTROL SYSTEMS WITH FLOW DIVIDER ASSEMBLIES

TECHNICAL FIELD

The present invention generally relates to fuel control systems for combustors of gas turbine engines, and more particularly relates to flow divider assemblies of fuel control systems.

BACKGROUND

A gas turbine engine may include multiple sets of nozzles and associated flow circuits that deliver fuel to various portions of a combustor. Particularly, a fuel control system functions to distribute a fuel flow from one or more fuel sources to the selected nozzle circuits in the gas turbine engine. Generally, the fuel control system includes a metering function that delivers a prescribed amount of total fuel flow to be combusted and a flow divider assembly that distributes the metered flow amongst the various nozzle circuits in a predictable manner.

Conventional flow divider assemblies may have difficulty maintaining a predetermined distribution to the various nozzle circuits, particularly over the full range of metered flow rates and downstream nozzle back pressures associated with engine operating conditions from start to max power. The accuracy of these systems is also often limited by unavoidable variations in nozzle back pressures, on both a unit-to-unit basis and in special cases, such as a nozzle blockage. Shortcomings in the accuracy of the flow dividing function can result in sub-optimal combustor performance. An additional drawback of conventional flow divider assemblies is the accumulation of pressure losses associated with conducting the flow division, particularly at high flow conditions. The resulting larger upstream fuel pressures increase the load on the engine main fuel pump, requiring more power extraction from the engine to run the pump and increasing system fuel temperatures.

Accordingly, it is desirable to provide a fuel control system with a flow divider assembly that provides a reliable and accurate distribution of fuel to combustor nozzles independent of flow rates and pressure variations without creating excessive system pressures. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a flow divider assembly is provided. The assembly includes a dividing valve and a balancing valve. The dividing valve includes a dividing cavity configured to receive a flow of fuel, the dividing cavity including a first dividing valve port and a second dividing valve port, and a piston device arranged within the dividing cavity and selectively positioned to divide the flow of fuel in the dividing cavity such that a first portion of the flow is directed into the first dividing valve port and a second portion of the flow is directed into the second dividing valve port. The balancing valve is fluidly coupled to the dividing valve and configured to receive the first portion of the flow at a first pressure and the second portion of the flow at a second pressure. The balancing valve includes a balancing cavity including a first balancing cavity port and a second balancing cavity port, and a balancing device arranged within the balancing cavity and selectively positioned to direct the first portion of the flow into the first balancing cavity port at a third pressure and the second portion of the flow into the second balancing cavity port at a fourth pressure such that the first pressure is approximately equal to the second pressure.

In accordance with an exemplary embodiment, a method is provided for supplying fuel to a combustor with a first nozzle, a second nozzle, and a third nozzle. The method includes the steps of: supplying a flow of fuel into a dividing valve; dividing, in the dividing valve, the flow of fuel into a first portion and a second portion at a predetermined proportion, each of the first portion and the second portion having a pressure; directing the first portion and the second portion into a balancing valve; equalizing, in the balancing valve, the pressures of the first portion and the second portion; directing the first portion to the first nozzle; and directing the second portion to at least one of the second nozzle and the third nozzle.

BRIEF DESCRIPTION OF THE DRAWINGS

The present invention will hereinafter be described in conjunction with the following drawing figures in which like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, exemplary embodiments discussed herein are directed to a fuel control system for delivering fuel to the combustor of a gas turbine engine. The fuel control system includes a flow divider assembly that selectively distributes fuel between the fuel nozzles of the combustor, particularly between main nozzles, nonenriched pilot nozzles, and enriched pilot nozzles. In one exemplary embodiment, the flow divider assembly includes a flow divider valve that that initially divides the fuel between the main nozzles and the pilot nozzles at a predetermined proportion. A flow balancing valve is downstream of the flow divider valve and equalizes the pressures of the apportioned fuel flows while maintaining the predetermined proportion from the flow divider valve. The flow balancing valve further includes a spring element that maintains a minimum pressurization downstream of the flow divider valve and allows both balancing valve elements to open with increasing flow to minimize pressure losses across the valve at engine high power conditions. The portion of fuel for the pilot nozzles is subsequently directed back to the flow divider valve and is selectively subdivided into conduits that deliver fuel to the nonenriched pilot nozzles and to the enriched pilot nozzles.

Figure 1:
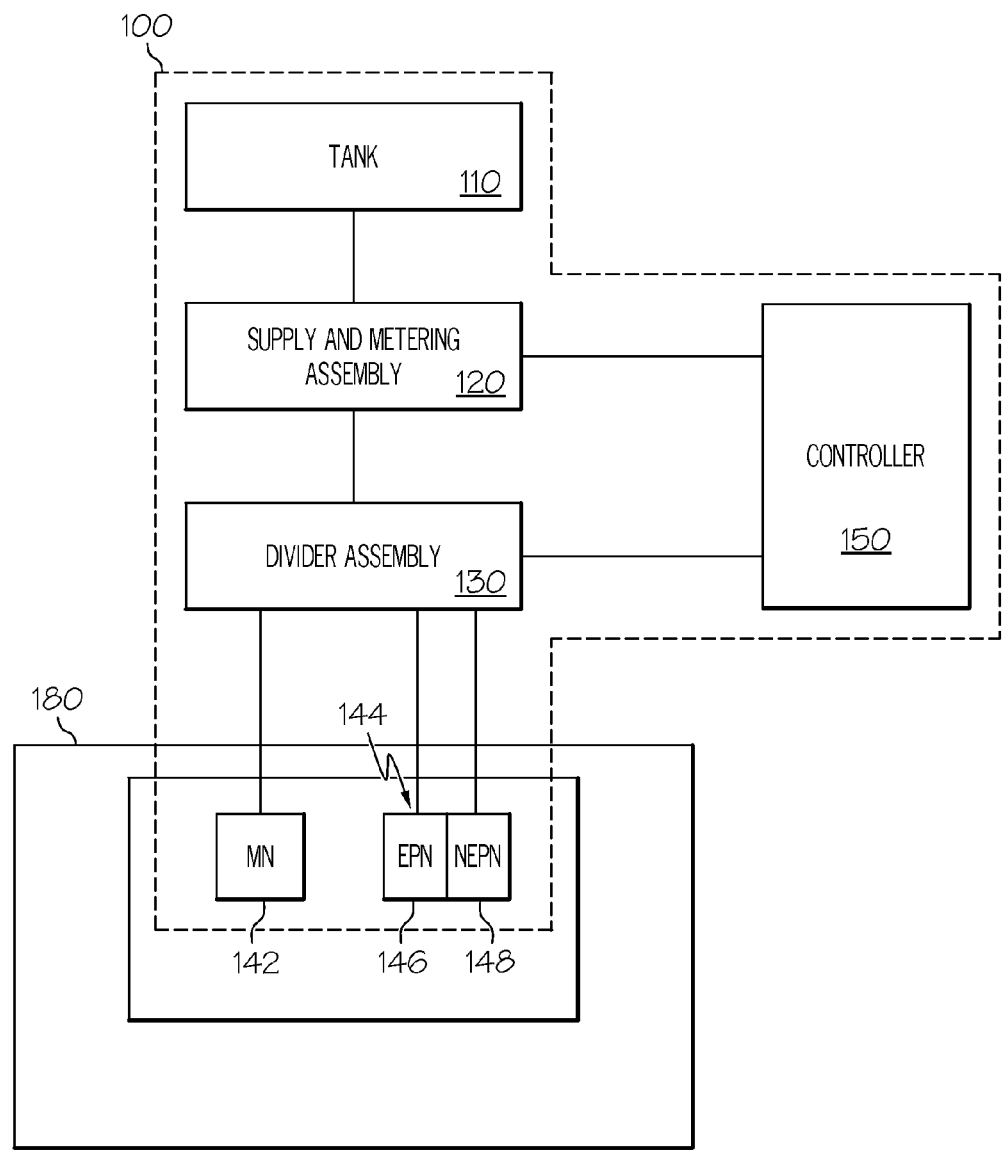
FIG. 1 is a simplified block diagram of an exemplary fuel control system for a combustor of a gas turbine engine in accordance with an exemplary embodiment.

FIG. 1 is a simplified block diagram of an exemplary fuel control system 100 for a combustor 182 of a gas turbine engine 180 in accordance with an exemplary embodiment. The gas turbine engine 180 may be, for example, an aircraft engine with any number of fans, compressor, turbines, and the like for extracting energy from burned fuel. The fuel control system 100 may include a fuel tank 110, a fuel supply and metering assembly 120, and a flow divider assembly 130. The flow divider assembly 130 is further coupled to at least two sets of nozzles 142 and 144 mounted within a combustion chamber of the combustor 182. In one exemplary embodiment, the nozzles 142 and 144 may be characterized as main nozzles 142 and pilot nozzles 144. The pilot nozzles 144 may be further grouped into enriched pilot nozzles 146 and nonenriched pilot nozzles 148. The fuel control system 100 further includes a controller 150 coupled to the fuel supply and metering assembly 120 and the flow divider assembly 130 for controlling operation of the fuel control system 100, as discussed in greater detail below.

During operation, the fuel supply and metering assembly 120 provides the flow divider assembly 130 with metered quantities of fuel withdrawn from the fuel tank 110 according to control signals provided by the controller 150. The flow divider assembly 130 then apportions the metered fuel received from fuel supply and metering assembly 120 between the main nozzles 142, the enriched pilot nozzles 146, and the nonenriched pilot nozzles 148 according to control signals provided by the controller 150. Although not shown, the fuel supply and metering assembly 120 may include various components suitable for providing the combustor 182 with metered fuel in this manner including, but not limited to, one or more boost pumps, high pressure pumps, filters, bypass valves, metering valves, pressurizing valves, and the like. Additionally, in some embodiments, the fuel supply and metering assembly 120 may be separated into a supply assembly and a metering assembly.

The predetermined apportionment of fuel flow between the main nozzles 142, enriched pilot nozzles 146, and nonenriched pilot nozzles 148 may be a function of engine condition or demands. For example, during initial start-up, it may be desirable to direct a large portion of the fuel flow to the enriched pilot nozzles 146 to initiate ignition in the combustor 182. As start-up continues, the proportion of fuel flow to the nonenriched pilot nozzles 148 may be increased. Further, during normal operating conditions, the fuel flow may be more evenly distributed between the main nozzles 142, enriched pilot nozzles 146, and nonenriched pilot nozzles 148, and during high power operation, a greater proportion may be distributed to the main nozzles 142. The controller 150 generally provides signals for the desired distribution based on operator commands, engine conditions, and/or engine feedback.

Figure 2:
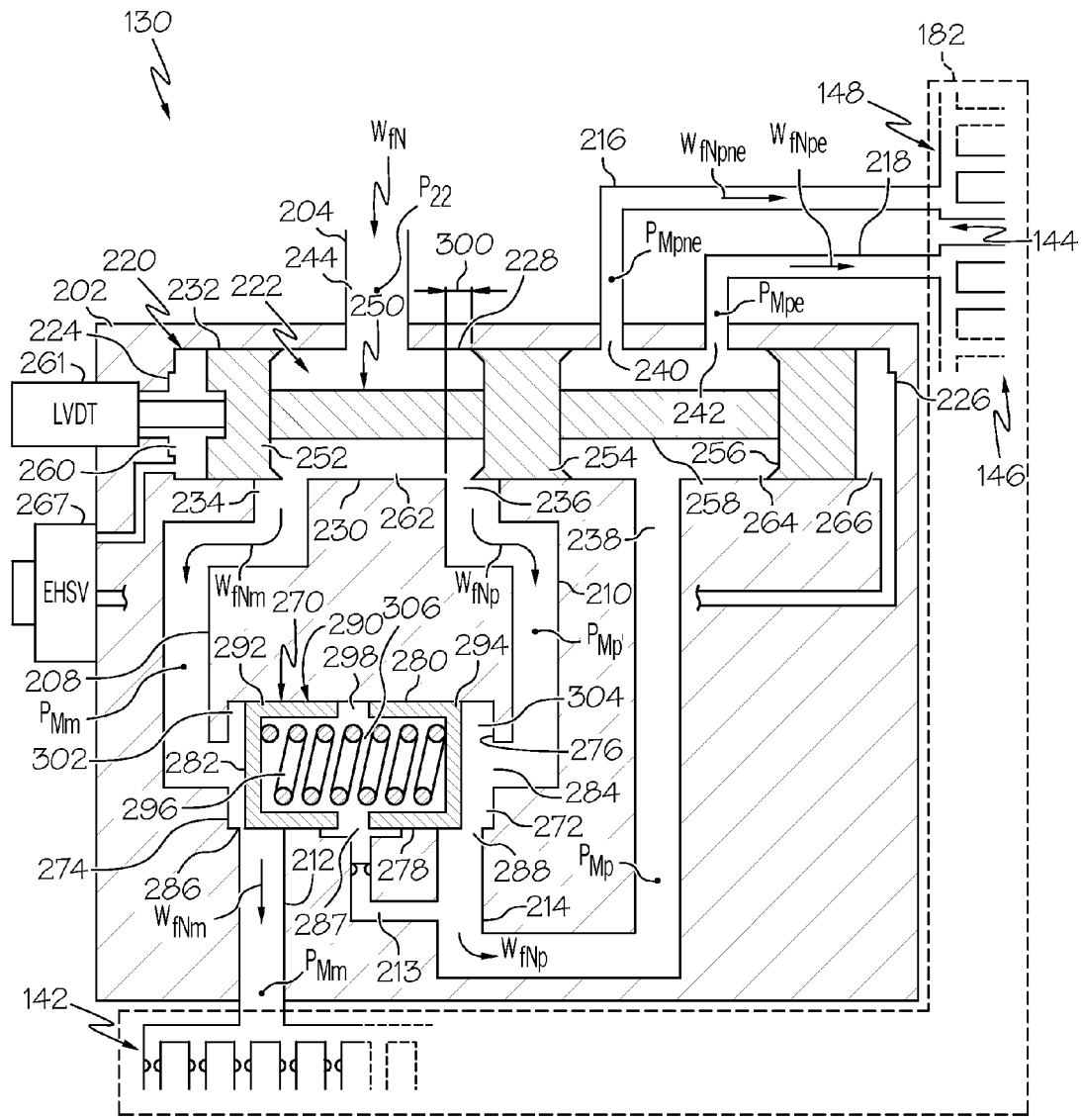
FIG. 2 is a schematic cross-sectional view of a flow divider assembly of the fuel control system of FIG. 1 in a first position in accordance with an exemplary embodiment.

FIG. 2 is a schematic diagram of a flow divider assembly 130 of the fuel control system 100 of FIG. 1 in a first position in accordance with an exemplary embodiment. The flow divider assembly 130 generally includes a flow dividing valve 220 and a balancing valve 270 positioned within a housing 202. Although FIG. 2 depicts the flow dividing valve 220 and the balancing valve 270 positioned within the single housing 202, in other embodiments, the flow dividing valve 220 and balancing valve 270 may be separated into separate housings. The flow divider assembly 130 further includes a number of conduits 208, 210, 212, 214, 216, and 218 that enable fluid communication between an inlet 204 of the flow divider assembly 130, the flow dividing valve 220, the balancing valve 270, and finally, the nozzles 142 and 144, as described below.

In one exemplary embodiment, the flow dividing valve 220 may be a cylindrical or spool-type valve that includes a cavity 222 formed in the housing 202 and a piston device 250. The cavity 222 is generally a longitudinal channel defined by end walls 224 and 226 and side walls 228 and 230. The side walls 228 and 230 further define a number of ports 234, 236, 238, 240, 242, and 244 that, when open, enable fuel to flow in or out of the flow dividing valve 220, as described in greater detail below.

The piston device 250 is formed by pistons 252, 254 and 256 mounted on a rod 258. In one exemplary embodiment the pistons 252, 254, and 256 are fixed relative to one another on the rod 258 to divide the cavity 222 into first, second, third, and fourth cavity sections 260, 262, 264, and 266. Particularly, the first cavity section 260 is defined between the first piston 252 and the end wall 224; the second cavity section 262 is defined between the first piston 252 and the second piston 254; the third cavity section 264 is defined between the second piston 254 and the third piston 256; and the fourth cavity section 266 is defined between the third piston 256 and the end wall 226.

The rod 258 and the pistons 252, 254, and 256 are configured to translate within the cavity 222 such that the pistons 252, 254, and 256 cover and uncover the ports 234, 236, and 240 in predetermined positions to deliver fuel to the desired downstream components, e.g., a combination of one or more of the main nozzles 142, enriched pilot nozzles 146, and nonenriched pilot nozzles 148. In the depiction of FIG. 2 as well as discussed below, the position of the piston device 250 is described with reference to distance 300, which is the distance between a first edge of the port 236 and the second piston 254. The positions of the piston device 250 and the resulting fuel flows are discussed in greater detail below.

Conduits 208 and 210 fluidly couple the second cavity section 262 of the flow dividing valve 220 to the balancing value 270. The balancing valve 270 may be a cylindrical or spool-type valve that includes a longitudinal cavity 272 formed by end walls 274 and 276 and side walls 278 and 280. In the depicted embodiment, ports 282 and 284 are respectively defined in the end walls 274 and 276, and ports 286, 287 and 288 are defined in side wall 278. A balancing device 290 is positioned within the cavity 272 to divide the cavity 272 into a first cavity section 302, a second cavity section 304, and a third, middle cavity section 306. The first cavity section 302 is defined by the balancing device 290 and the end wall 274, the second cavity 304 is defined by the balancing device 290 and the end wall 276, and the third cavity 306 is defined as the region within the balancing device 290.

The balancing device 290 of the balancing valve 270 is formed by a first element 292 and a second element 294 coupled together with a spring element 296. As shown, the first and second elements 292 and 294 may individually and collectively translate within the cavity 272. Particularly, the spring element 296 urges the first and second elements 292 and 294 away from one another such that the first and second elements 292 and 294 may individually translate relative to one another against or with the spring element 296. The first and second elements 292 and 294 may be individually biased away from each other by the spring element 296 until forced against respective end walls 274 and 276. Additionally, the first and second elements 292 and 294 may be biased towards one other (e.g., against the force of the spring element 296) until a gap 298 is closed and the first element 292 and second element 294 contact one another. The first and second elements 292 and 294 and the spring element 296 may also translate together within the cavity 272. As shown in FIG. 2 and discussed below, the first and second elements 292 and 294 slide to cover and uncover the ports 286 and 288.

When port 286 is at least partially uncovered, conduit 212 fluidly couples the first cavity section 302 of the balancing valve 270 to the main nozzles 142 of the combustor 182, as discussed above. When port 288 is at least partially uncovered, conduit 214 fluidly couples the second cavity section 304 of the balancing valve 270 to the third cavity section 264 of the flow dividing valve 220. Port 287 is open at all balancing device operating positions and fluidically couples middle cavity 306 to conduit 213 which is in turn coupled to conduit 214.

Based on the positions of the pistons 254 and 256, the third cavity section 264 of the flow dividing valve 220 is selectively in fluid communication with the conduits 216 and 218 via the ports 240 and 242. The fuel flowing through port 242 into conduit 218 is delivered to the enriched pilot nozzles 146, and the fuel flowing through port 240 into conduit 216 is delivered to the nonenriched pilot nozzles 148.

Now that the general structure and flow paths of fuel in the fuel divider assembly 130 have been described, further details about the operation of the flow dividing valve 220 and balancing valve 270 will now be discussed. Throughout the description below, the following acronyms are used to denote various reference pressures and flow rates:

$P_{22}$ Pressure at inlet 204
$W_{fN}$ Flow rate at inlet 204
$W_{fNm}$ Main nozzle flow rate in conduit 208 and 212
$W_{fNp}$ Pilot nozzle flow rate in conduits 210 and 214
$P_{Mm'}$ Pressure of main nozzle flow in conduit 208
$P_{Mp'}$ Pressure of pilot nozzle flow in conduit 210
$P_{Mm}$ Pressure at main nozzles 142
$P_{Mp}$ Pressure of pilot nozzle flow in conduit 214
$W_{fNpne}$ Flow rate at nonenriched pilot nozzles 148
$P_{Mpne}$ Pressure at nonenriched pilot nozzles 148
$W_{fNpe}$ Flow rate at enriched pilot nozzles 146
$P_{Mpe}$ Pressure at enriched pilot nozzles 146

As noted above, the flow divider assembly 130 receives fuel from the fuel supply and metering assembly 120 via inlet 204. The inlet 204 is fluidly coupled to the flow dividing valve 220 at port 244 such that fuel initially flows into the second cavity section 262 of cavity 222 at pressure ($P_{22}$) and flow rate ($W_{fN}$). The second cavity section 262 is fluidly coupled to one or both of the conduits 208 and 210 via ports 234 and 236 based on the position of the piston device 250. As shown in FIG. 2, the first piston 252 is configured to selectively block all or a portion of port 234, and the second piston 254 is configured to selectively block all or a portion of port 236. Since the position of the first piston 252 is fixed relative to the position of the second piston 254, the pistons 252 and 254 move in conjunction such that when the first piston 252 moves to cover the port 234 (e.g., in the right hand direction of FIG. 2 to increase distance 300), the second piston 254 uncovers the port 236. Generally, the ports 234 and 236 and the pistons 252 and 254 are the same size and shape such that moving the pistons 252 and 254 results in the ports 234 and 236 opening and closing in equally opposite amounts. In other words, the piston 252 may be positioned to at least partially block the port 234, and the piston 254 may be positioned to at least partially block the port 236. In any given position, the unblocked portion of port 234 corresponds to the blocked portion of port 236, and vice versa. Moreover, any change in the blocked or unblocked cross-sectional areas respectively results in a corresponding change to the unblocked or blocked cross sectional areas.

As such, by positioning the piston device 250, the flow dividing valve 220 may apportion a first portion ($W_{fNm}$) of the fuel ("main nozzle fuel" or "primary/main circuit") at a pressure ($P_{Mm'}$) through port 234 to conduit 208 and a second portion ($W_{fNp}$) of the fuel ("pilot nozzle fuel" or "secondary/pilot circuit") at a pressure (NO through port 236 to conduit 210. In the position depicted by FIG. 2, the first and second pistons 252 and 254 are positioned such that approximately 50% of the fuel flows through port 234 and 50% of the fuel flows through port 236. However, the piston device 250 may move to apportion the fuel flow in any desired percentage amount, e.g., such as 40%/60%, 30%/70%, and so on. As described above, the controller 150 may provide signals to translate the piston device 250 into any position to provide the desired proportion of fuel to the nozzles 142 and 144 based on operating conditions, engine feedback, or operator control. As described above, however, the pilot nozzle fuel and main nozzle fuel are not immediately delivered from the flow dividing valve 220 to the nozzles 142 and 144.

As also shown in FIG. 2, the flow dividing valve 220 may include a sensor 261 and an actuator 267 that function to position the piston device 250 based on commands from the controller 150 (FIG. 1). In one exemplary embodiment, the sensor 261 may be a linear variable differential transformer (LVDT). In the embodiment depicted in FIG. 2, the LVDT 261 is coupled to the piston device 250, particularly to piston 252, to determine the position of the piston device 250. The LVDT 261 may provide an indication of the position of the piston device 250 in the cavity 222 to the controller 150 (FIG. 1). The actuator 267 may be, for example, an electrohydraulic servo valve (EHSV) that modulates the pressures within the cavity sections 260 and 267, and thus, the position of the piston device 250 based on control signals from the controller 150. As such, the LVDT 261 and EHSV 267 cooperate to maintain or adjust the piston device 150 into the appropriate position for delivering a desired proportion of fuel to the selected nozzles 142, 146, and/or 148, as discussed below. Other sensor and control mechanisms may be provided.

The conduit 208 delivers main nozzle fuel to the balancing valve 270 via port 282, and the conduit 210 delivers the pilot nozzle valve fuel to the balancing valve 270 via port 284. Particularly, the main nozzle fuel is directed to the first cavity section 302 and the pilot nozzle fuel is directed to the second cavity section 304.

The balancing valve 270 functions to equalize the pressures of the pilot nozzle fuel and the main nozzle fuel and to maintain the predetermined split of fuel from the flow dividing valve 220 independent of the total fuel magnitude (e.g., $W_{fN}$) and independent of variations in downstream pressures (e.g., changes in $P_{Mm}$, $P_{Mp}$, $P_{Mpne}$, and $P_{Mpe}$). As noted above, the balancing device 290 includes two elements 292 and 294 that are biased in opposing directions by a spring element 296. Since the elements 292 and 294 may translate together with the spring element 296 in the cavity 272, the pressures in cavities 302 and 304 equalize. In other words, since elements 292 and 294 are substantially identical in cross-sectional area, a pressure increase in one cavity section 302 or 304 will force the balancing device 290 towards the other cavity section 304 or 302 until the pressures equalize (e.g., until pressures $P_{Mm'}$ and $P_{Mp'}$ equalize). Thus, since the fluid pressures downstream of the dividing valve are equal, the flow of fluid through ports 234 and 236 (e.g., $W_{fNm}$ and $W_{fNp}$) as a percentage of total flow ($W_{fN}$) is directly dependent on the relationship between the open areas of ports 234 and 236. With this area relationship set up as described previously, the percentage flow split is a direct and linear function of dividing valve position, independent of total flow ($W_{fN}$), nozzle circuit back pressure ($P_{Mm}$, $P_{Mp}$, $P_{Mpne}$, and $P_{Mpe}$) magnitudes, and variations in downstream restrictions. In other embodiments, the relationship between the open areas of ports 234 and 236 may be non-linear.

In addition to maintaining the flow distribution ($W_{fNm}$ to $W_{fNp}$) and equalizing pressures ($P_{Mm'}$ and $P_{Mp'}$), the balancing valve 270 also maintains a minimum pressurization for the flowing nozzle circuits by maintaining a minimum pressure of fuel in conduits 208 and/or 210. This pressure potential can be useful in powering supplemental parallel flow circuits, e.g. those used for cooling or motive flow. The spring element 296 biases the elements 292 and 294 at a predetermined force. During non-flowing conditions in either or both of the main and pilot circuits, e.g. engine shutdown or ports 234 or 236 covered by the dividing valve 220, the spring element 296 biases the elements 292 and 294 against the respective end walls 274 and 276 to close the one or both of the ports 286 and 288. However, as flow is initiated in either of the main and pilot circuits, the pressure in conduit 208 ($P_{Mm'}$) or 210 ($P_{Mp'}$), respectively, rises until it is large enough with respect downstream pilot circuit pressure ($P_{Mp}$), as communicated to the middle cavity 306 of the balancing valve 270 by conduit 213 and port 287, to overcome the predetermined spring force, translating element 292 or 294 against the spring to open the ports 286 or 288. In this manner, the predetermined force of the spring element 296 provides a minimum upstream pressurization relative to the downstream pilot nozzle circuit pressure ($P_{Mp}$). In one exemplary embodiment, the minimum pressurization may be, for example, 20 psid. As flow levels increase in the main and pilot circuits, elements 292 and 294 continue to translate against spring element 296, further opening ports 286 and 288 to the limiting condition of closing gap 298. In this manner, pressure losses through balancing valve 270 at high flows are minimized to prevent over-pressurizing the upstream components. Furthermore, once gap 298 is closed, elements 292 and 294 connect to short out the spring force and create a less dynamically active balancing valve component 270.

As such, with both main and pilot circuits flowing, the main pressure ($P_{Mm'}$) at the inlet of the balancing valve 270 in conduit 208 is equal to the pilot pressure ($P_{Mp'}$) at the inlet of the balancing valve 270. Additionally, main flow rate ($W_{fNm}$) in conduit 208 is equal to the main flow rate ($W_{fNm}$) in conduit 212, and pilot flow rate ($W_{fNp}$) in conduit 210 is equal to the pilot flow rate ($W_{fNp}$) in conduit 214. The proportion of the main flow rate and pilot flow rate ($W_{fNm}$ to $W_{fNp}$) is maintained downstream of the flow dividing valve 220 throughout the flow divider assembly 130.

As noted above, the main nozzle fuel flows through conduit 212 and out of the flow divider assembly 130 to the main nozzles 142. The pilot nozzle fuel flows through conduit 214 to the third cavity section 264 of the balancing valve 270. In the balancing valve 270, the piston 254 is positioned on the piston rod 258 to selectively cover and uncover port 240. The piston 254 is particularly positioned to provide a desired proportion of the pilot fuel ($W_{fNp}$) to the conduit 216 as nonenriched pilot fuel ($W_{fNpne}$) and the conduit 218 as enriched pilot fuel ($W_{fNpe}$). In this manner, the controller 150 (FIG. 1) may provide a greater amount of fuel to the enriched pilot nozzles 146 as necessary or desired based on feedback, operating conditions, and/or operator control.

Although not shown, a second balancing valve may be provided between the dividing valve 220 and the pilot nozzles 146 and 148. In an embodiment, the second flow balancing valve may have structure and function similar to the flow balancing valve 270 and equalize the pressures in the pilot nozzle flow conduits 216 and 218 (e.g., pressures $P_{Mpne}$ and $P_{Mpe}$) to maintain the predetermined apportionment of fuel between the enriched pilot nozzles 146 and the nonenriched pilot nozzles 148.

Figure 3:
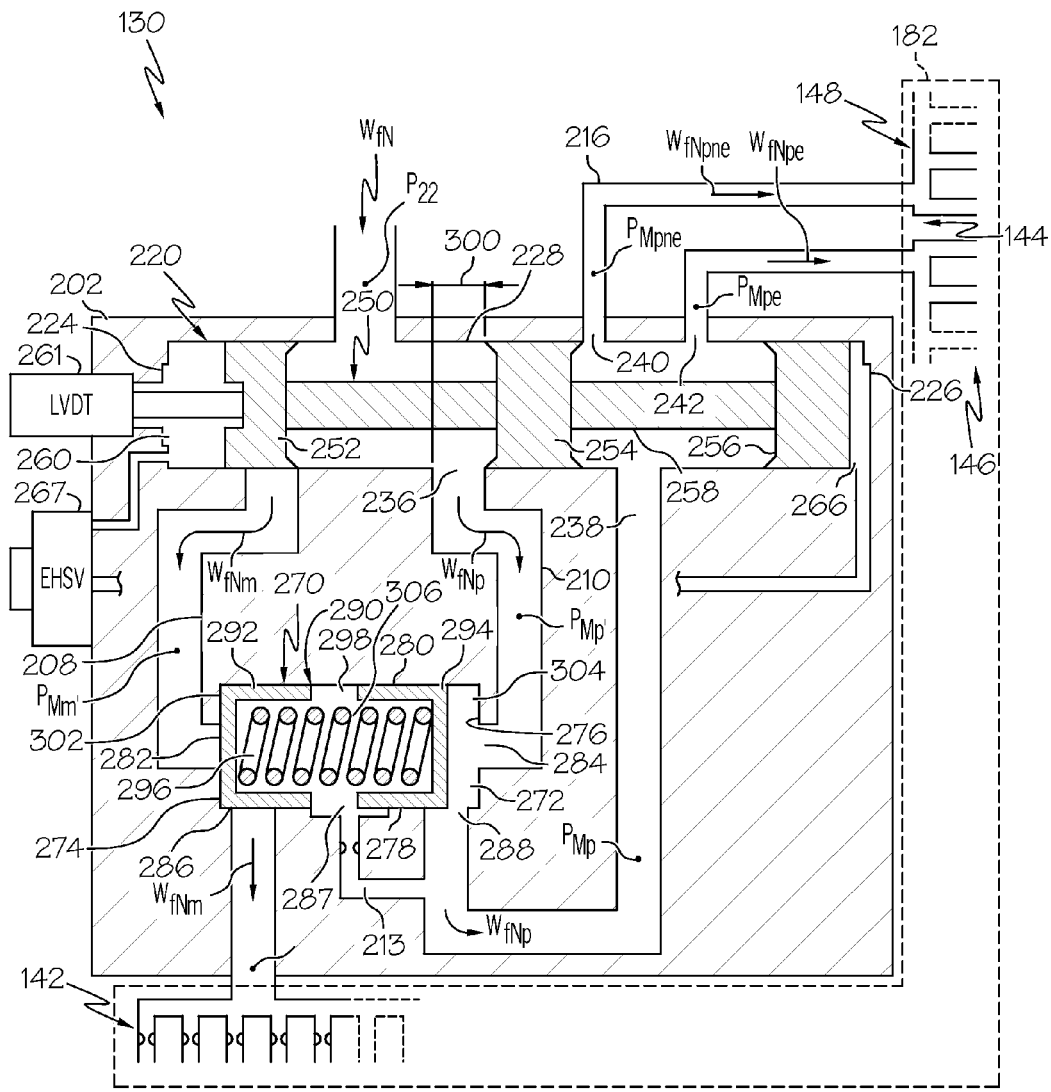
FIG. 3 is a schematic cross-sectional view of a flow divider assembly of the fuel control system of FIG. 1 in a second position in accordance with an exemplary embodiment.
Figure 4:
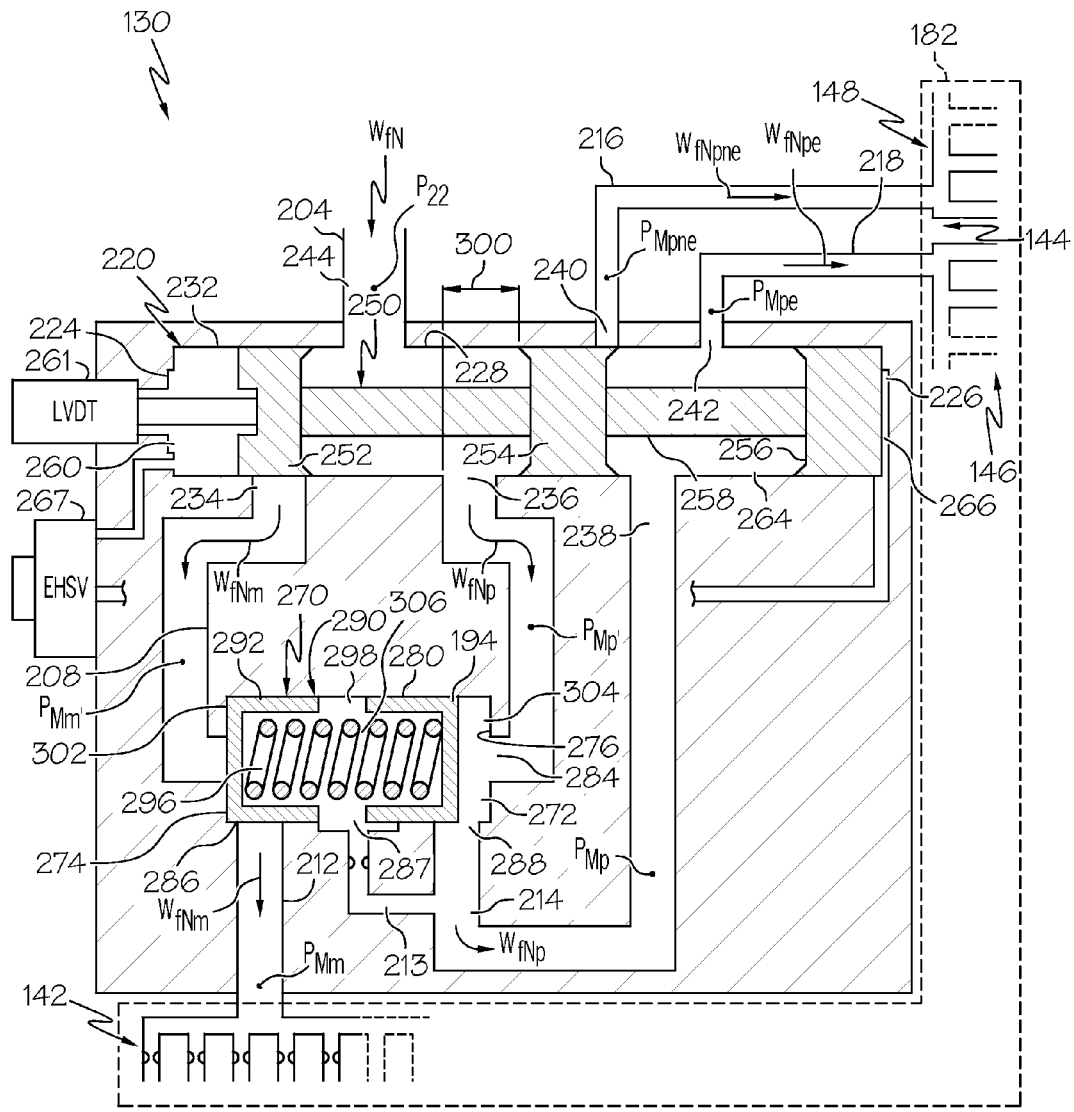
FIG. 4 is a schematic cross-sectional view of a flow divider assembly of the fuel control system of FIG. 1 in a third position in accordance with an exemplary embodiment.

Other positions are illustrated in FIGS. 3 and 4. For example, as shown in FIG. 3, the piston device 250 has been positioned such that the first piston 252 completely covers the port 234 such that 100% of the fuel ($W_{fN}$) flows into the conduit 210 (e.g., as $W_{fNp}$) to be subsequently provided to the pilot nozzles 144. As also shown in FIG. 3, the second piston 254 is positioned such that an equal amount of fuel flows into the conduit 216 for the nonenriched pilot nozzles 148 and into the conduit 218 for the enriched pilot nozzles 146. As also shown in FIG. 3, with zero flow in conduit 208, element 292 of balancing valve 270 is closed, biased by spring 296 against end wall 274. In FIG. 4, the device 250 has been positioned such that the first piston 252 completely covers the port 234 such that 100% of the fuel ($W_{fN}$) flows into the conduit 210 to be subsequently provided to the enriched pilot nozzles 146. However, in contrast to FIG. 3, the second piston 254 in FIG. 4 is positioned such that the second piston 254 covers the port 240 to the nonenriched pilot nozzles 148 and 100% of the fuel ($W_{fN}$) is directed into the conduit 218 for the enriched pilot nozzles 146 (e.g., as $W_{fNpe}$).

Figure 5:
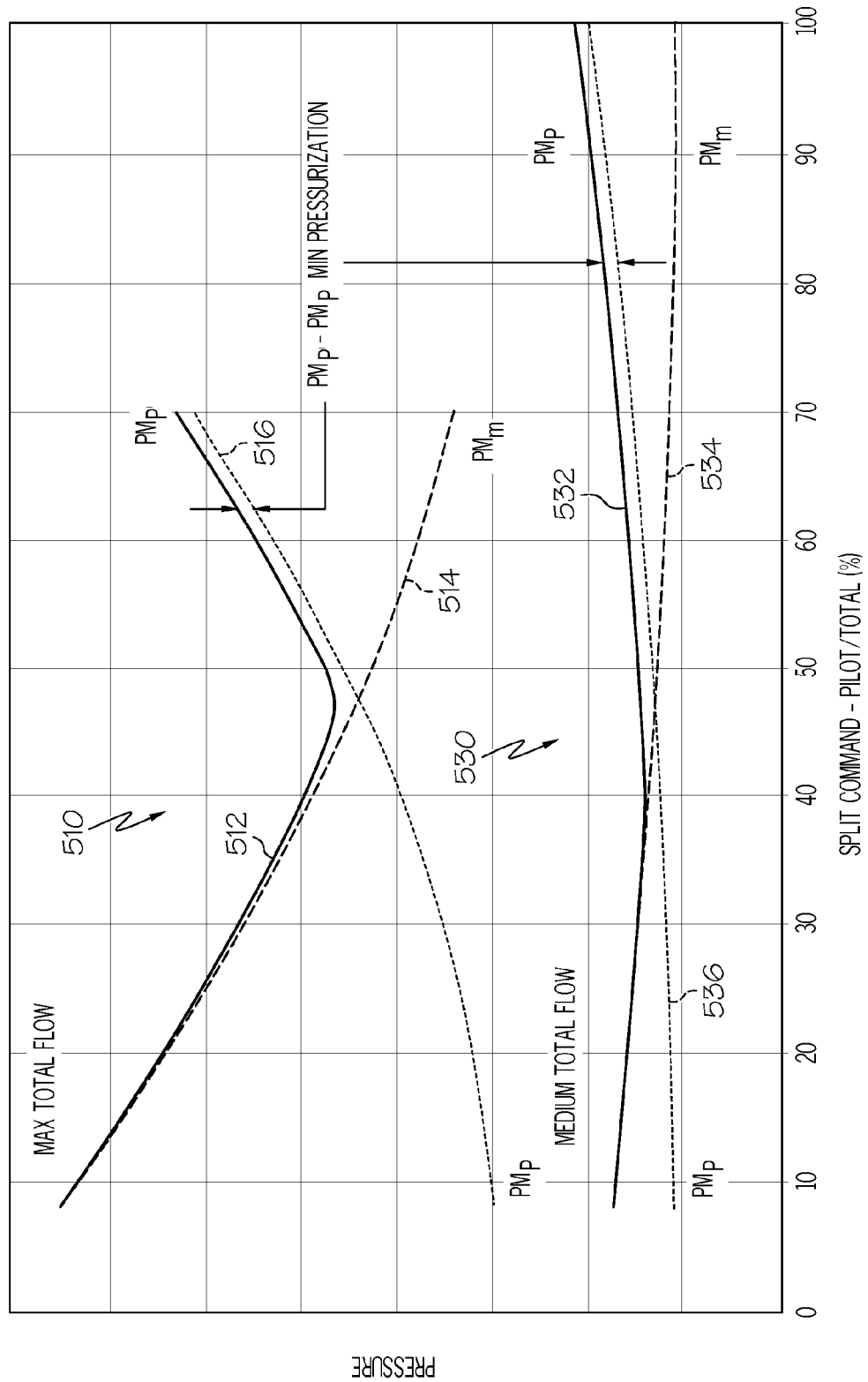
FIG. 5 is a graph illustrating pressurization performance of the flow divider assembly of FIGS. 2-4 in accordance with an exemplary embodiment.

FIG. 5 is a graph illustrating pressurization performance of the flow divider assembly, such as the flow divider assembly of FIGS. 2-4, which are also referenced below. In FIG. 5, pressure is represented on the vertical axis and the split between the pilot and main circuits (expressed as the percentage of pilot circuit flow ($W_{fNp}$) relative to the total flow ($W_{fN}$)) is represented on the horizontal axis. Representative data is shown for the max total metered flow case 510 and medium total metered flow case 530. Line 512 represents the change in pilot flow pressure ($P_{Mp'}$) in the conduit 210 as a function of the percentage of pilot flow. Line 514 represents the change in main flow pressure ($P_{Mm}$) at the nozzles 142 as a function of the percentage of pilot flow. Line 516 represents the change in pilot flow pressure ($P_{Mp}$) in conduit 214 as a function of the percentage of pilot flow. As shown, the difference between the pilot flow pressure ($P_{Mp'}$) in the conduit 210 and pilot flow pressure ($P_{Mp}$) in conduit 214 corresponds to at least the minimum pressurization enabled by the balancing valve 270, yet does not exceed the greater of the two downstream nozzle-generated back pressures ($P_{Mp}$ or $P_{Mm}$) by a significantly larger amount at any point in the displayed operating envelope. Similarly, line 532 represents the change in pilot flow pressure ($P_{Mp'}$) in the conduit 210 as a function of the percentage of pilot flow. Line 534 represents the change in main flow pressure ($P_{Mm}$) at the nozzles 142 as a function of the percentage of pilot flow. Line 536 represents the change in pilot flow pressure ($P_{Mp}$) in conduit 214 as a function of the percentage of pilot flow. As shown, the difference between the pilot flow pressure ($P_{Mp'}$) in the conduit 210 and pilot flow pressure ($P_{Mp}$) in conduit 214 corresponds to at least the minimum pressurization enabled by the balancing valve 270, yet does not exceed the greater of the two downstream nozzle-generated back pressures ($P_{Mp}$ or $P_{Mm}$) by a significantly larger amount at any point in the displayed operating envelope.

Accordingly, a fuel control system with a flow divider assembly is provided. The flow divider valve initially divides the fuel between the main nozzles and the pilot nozzles at a predetermined proportion. The flow balancing valve is downstream of the flow divider valve and equalizes the pressures of the apportioned fuel flows while maintaining the predetermined proportion from the flow divider valve. The flow balancing valve further includes a spring element that maintains a minimum pressurization downstream of the flow dividing valve and minimizes excessive pressure losses at high flow conditions. The portion of fuel for the pilot nozzles is subsequently directed back to the flow divider valve and is selectively subdivided into conduits that deliver fuel to the nonenriched pilot nozzles and to the enriched pilot nozzles. In one exemplary embodiment, the flow divider assembly is provided in a single housing to apportion fuels between the main fuel nozzles, the nonenriched pilot fuel nozzles, and the enriched pilot fuel nozzles in a predictable proportion independent of total flow magnitude and downstream pressure variations.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flow divider assembly, comprising:
  a dividing valve comprising:
    a dividing cavity configured to receive a flow of fuel, the dividing cavity including a first dividing valve port and a second dividing valve port, and
    a piston device arranged within the dividing cavity and selectively positioned to divide the flow of fuel in the dividing cavity such that a first portion of the flow is directed into the first dividing valve port and a second portion of the flow is directed into the second dividing valve port; and
  a balancing valve fluidly coupled to the dividing valve and configured to receive the first portion of the flow at a first pressure and the second portion of the flow at a second pressure, the balancing valve comprising:
    a balancing cavity including a first balancing cavity port and a second balancing cavity port, and
    a balancing device arranged within the balancing cavity and selectively positioned to direct the first portion of the flow into the first balancing cavity port at a third pressure and the second portion of the flow into the second balancing cavity port at a fourth pressure such that the first pressure is approximately equal to the second pressure,
  wherein the piston device comprises a rod and a first piston and a second piston arranged in fixed positions on the rod, and wherein the first piston, second piston, and rod are configured to translate with one another within the dividing cavity such that the first piston selectively blocks the first dividing cavity port and the second piston selectively blocks the second dividing cavity port,
  wherein the dividing cavity further comprises a third dividing cavity port and a fourth dividing cavity port, and wherein the dividing cavity is fluidly coupled to the second balancing valve port to receive the second portion of flow and is further configured to divide the second portion of flow such that a third portion of flow is directed into the third dividing cavity port and a fourth portion of flow is directed into the fourth dividing cavity port.

2. The flow divider assembly of claim 1, wherein the dividing cavity is configured to divide the first portion of the flow and the second portion of the flow into a predetermined proportion.

3. The flow divider assembly of claim 2, wherein the balancing valve is configured to maintain the predetermined proportion independent of the third pressure and the fourth pressure.

4. The flow divider assembly of claim 2, wherein the balancing valve is configured to maintain the predetermined proportion independent of a total magnitude of the flow.

5. The flow divider assembly of claim 1, wherein, in a first position, the first piston partially blocks the first dividing cavity port to form a first blocked cross-sectional area and a first unblocked cross-sectional area and the second piston partially blocks the second dividing cavity port to form a second blocked cross-sectional area and a second unblocked cross-sectional area, and wherein the first blocked cross-sectional area is equal to the second unblocked cross-sectional area.

6. The flow divider assembly of claim 5, wherein the piston device is configured to translate such that a change in the first blocked cross-sectional area is equal to a change in the second unblocked cross-sectional area.

7. The flow divider assembly of claim 1, wherein the piston device further comprises third piston arranged on the rod, and wherein the second piston, the third piston, and the rod are configured to translate with one another within the dividing cavity such that the second piston selectively blocks the third dividing cavity port.

8. The flow divider assembly of claim 1, wherein the balancing valve comprises a first balancing valve element, a second balancing element, and a spring element biasing the first balancing valve element away from the second balancing valve element.

9. The flow divider assembly of claim 8, wherein the first balancing valve element, the second balancing valve element, and the spring element are configured to move with one another within the balancing cavity, and wherein the first balancing valve element and the second balancing valve element are configured to move relative to one another with compression and expansion of the spring element.

10. The flow divider assembly of claim 9, wherein the first balancing valve element is configured to selectively cover the first balancing cavity port and the second balancing valve element is configured to selectively cover the second balancing cavity port.

11. The flow divider assembly of claim 10, wherein the spring element is configured to bias the second balancing valve element to block the second balancing cavity port when the second pressure is less than a predetermined pressure differential relative to fourth pressure, and to bias the first balancing valve element to block the first balancing cavity port when the first pressure is less than a predetermined pressure above the fourth pressure.

12. The flow divider assembly of claim 11, wherein the spring element has a spring preload that corresponds to a predetermined minimum pressurization of the flow divider assembly.

13. A method for supplying fuel to a combustor with a first nozzle, a second nozzle, and a third nozzle, the method comprising the steps of:
supplying a flow of fuel into a dividing valve;
dividing, in the dividing valve, the flow of fuel into a first portion and a second portion at a predetermined proportion, the first portion having a first pressure and the second portion having a second pressure;
directing the first portion and the second portion into a balancing valve;
equalizing, in the balancing valve, the first pressure and the second pressure;
directing the first portion to the first nozzle; and
directing the second portion to at least one of the second nozzle and the third nozzle, wherein the dividing valve comprises
a dividing cavity configured to receive the flow of fuel, the dividing cavity including a first dividing valve port and a second dividing valve port, and
a piston device arranged within the dividing cavity and selectively positioned to divide the flow of fuel in the dividing cavity such that the first portion of the flow is directed into the first dividing valve port and the second portion of the flow is directed into the second dividing valve port; and
a balancing valve fluidly coupled to the dividing valve and configured to receive the first portion of the flow at the first pressure and the second portion of the flow at the second pressure, the balancing valve comprising:
a balancing cavity including a first balancing cavity port and a second balancing cavity port, and
wherein the balancing device is arranged within the balancing cavity and selectively positioned to direct the first portion of the flow into the first balancing cavity port at a third pressure and the second portion of the flow into the second balancing cavity port at a fourth pressure such that the first pressure is approximately equal to the second pressure,
wherein the balancing valve comprises a first balancing valve element, a second balancing element, and a spring element biasing the first balancing valve element away from the second balancing valve element,
wherein the first balancing valve element, the second balancing valve element, and the spring element are configured to move with one another within the balancing cavity, and wherein the first balancing valve element and the second balancing valve element are configured to move relative to one another with compression and expansion of the spring element,
wherein the first balancing valve element is configured to selectively cover the first balancing cavity port and the second balancing valve element is configured to selectively cover the second balancing cavity port, and
wherein the spring element is configured to bias the second balancing valve element to block the second balancing cavity port when the second pressure is less than a predetermined pressure differential relative to fourth pressure, and to bias the first balancing valve element to block the first balancing cavity port when the first pressure is less than a predetermined pressure above the fourth pressure.

14. The method of claim 13, wherein the step of directing the second portion includes
directing the second portion to the dividing valve,
dividing, in the dividing valve, the second portion into a third portion and a fourth portion,
directing the third portion to the second nozzle, and
directing the fourth portion to the third nozzle.

15. The method of claim 14, wherein the equalizing step including maintaining the predetermined proportion independent of the first and second pressures.

16. The method of claim 14, wherein the dividing step includes selectively and at least partially blocking a first dividing valve port with the first piston and a second dividing valve port with the second piston.

17. The method of claim 16, wherein the dividing step further includes translating the first and second pistons such that a change in a blocked cross-sectional area of the first dividing valve port is equal to a change in an unblocked cross-sectional area of the second dividing valve port.

18. A flow divider assembly, comprising:
a dividing valve comprising:
a dividing cavity configured to receive a flow of fuel, the dividing cavity including a first dividing valve port and a second dividing valve port, and
a piston device arranged within the dividing cavity and selectively positioned to divide the flow of fuel in the dividing cavity such that a first portion of the flow is directed into the first dividing valve port and a second portion of the flow is directed into the second dividing valve port; and
a balancing valve fluidly coupled to the dividing valve and configured to receive the first portion of the flow at a first pressure and the second portion of the flow at a second pressure, the balancing valve comprising:
a balancing cavity including a first balancing cavity port and a second balancing cavity port, and
a balancing device arranged within the balancing cavity and selectively positioned to direct the first portion of the flow into the first balancing cavity port at a third pressure and the second portion of the flow into the second balancing cavity port at a fourth pressure such that the first pressure is approximately equal to the second pressure,
wherein the balancing valve comprises a first balancing valve element, a second balancing element, and a spring element biasing the first balancing valve element away from the second balancing valve element,
wherein the first balancing valve element, the second balancing valve element, and the spring element are configured to move with one another within the balancing cavity, and wherein the first balancing valve element and the second balancing valve element are configured to move relative to one another with compression and expansion of the spring element,
wherein the first balancing valve element is configured to selectively cover the first balancing cavity port and the second balancing valve element is configured to selectively cover the second balancing cavity port, and
wherein the spring element is configured to bias the second balancing valve element to block the second balancing cavity port when the second pressure is less than a predetermined pressure differential relative to fourth pressure, and to bias the first balancing valve element to block the first balancing cavity port when the first pressure is less than a predetermined pressure above the fourth pressure.

19. The flow divider assembly of claim 18, wherein the piston device comprises a rod and a first piston and a second piston arranged in fixed positions on the rod, and wherein the first piston, second piston, and rod are configured to translate with one another within the dividing cavity such that the first piston selectively blocks the first dividing cavity port and the second piston selectively blocks the second dividing cavity port, wherein the dividing cavity further comprises a third dividing cavity port and a fourth dividing cavity port, and wherein the dividing cavity is fluidly coupled to the second balancing valve port to receive the second portion of flow and is further configured to divide the second portion of flow such that a third portion of flow is directed into the third dividing cavity port and a fourth portion of flow is directed into the fourth dividing cavity port.

* * * * *